No. 812,371. PATENTED FEB. 13, 1906.
J. A. SECOR.
SPEED REGULATOR FOR EXPLOSIVE ENGINES.
APPLICATION FILED MAR. 16, 1904.

WITNESSES:

INVENTOR.
John Alstyne Secor
BY
James A. Whitney
ATTORNEY.

No. 812,371.

PATENTED FEB. 13, 1906.

J. A. SECOR.
SPEED REGULATOR FOR EXPLOSIVE ENGINES.
APPLICATION FILED MAR. 16, 1904.

WITNESSES:

INVENTOR.
John Alstyne Secor
BY
James A. Whitney
ATTORNEY.

No. 812,371.  PATENTED FEB. 13, 1906.
J. A. SECOR.
SPEED REGULATOR FOR EXPLOSIVE ENGINES.
APPLICATION FILED MAR. 16, 1904.

WITNESSES:

INVENTOR.
John Alstyne Secor
BY
James A. Whitney
ATTORNEY.

UNITED STATES PATENT OFFICE.

JOHN ALSTYNE SECOR, OF NEW YORK, N. Y., ASSIGNOR TO GENERAL POWER COMPANY, A CORPORATION OF NEW JERSEY.

SPEED-REGULATOR FOR EXPLOSIVE-ENGINES.

No. 812,371.    Specification of Letters Patent.    Patented Feb. 13, 1906.

Application filed March 16, 1904. Serial No. 198,345.

*To all whom it may concern:*

Be it known that I, JOHN ALSTYNE SECOR, a citizen of the United States, residing in the borough of Brooklyn, in the city of New York, county of Kings, State of New York, have invented new and useful Improvements in Internal-Combustion Engines, of which the following is a specification.

This invention relates generally to internal combustion or explosion engines, and particularly to that class of such engines as employ a non-volatile liquid fuel—such, for example, as commercial kerosene-oil—one object of this invention being to correlate under a common unitary control the several recurrent cyclic operations which affect speed, power, and fuel consumption. In order to obtain this result, an air throttling-valve, a fuel throttling-valve, a water throttling-valve, and an electric ignition-timing mechanism are unitedly actuated by means of a common control or governor, so that the separate movements of each of these several mechanisms are cooperatively regulated in unison the control or governor thereby simultaneously determining the relative proportions of the constituents of the fuel mixture, the volume, and thereby the compression of each charge, the internal temperature of the combustion chamber, and the time of ignition.

My invention therefore comprises means for obtaining a triple-unit control over, first, the internal heat; second, the transformation of heat into power, and, third, power production, thus the temperature of the combustion-chamber being regulated by the admixture of finely-atomized water as a constituent element of the fuel charge, and the quantity of water thus supplied for the absorption of excess heat being varied in consonance with the variation in engine speed or power output. As concerns the transformation of heat into power, the proportions of the several ingredients in the fuel mixture are varied with micrometric precision in thermodynamic correlation with the degree of compression, and as to power production, the mean effective pressure of the working stroke which determines speed and power, being controlled by varying in correlation the proportions, quantity, and compression of the fuel charge, the time of ignition, and temperature of combustion, secures the improved results.

As a matter of convenience in the annexed drawings, making a part of this specification, I show my invention as applied to a vertical single-cylinder engine designed to use heavy or non-volatile oil as fuel and having the combustion-chamber adjacent to the cylinder and admission and exhaust valves of the puppet type operating upon the cycle of Beau de Rochas. For purposes of illustration I show one engine in which the time of ignition is controlled manually, while the admission of the air and fuel is controlled directly by the governor and the admission of the starting fuel and water is controlled by the action of the governor-controlled volume of air as it passes to the combustion-chamber through the air-inlet passage. I also show in another figure an engine in which the time of ignition, the supply of air and fuel, and the supply of water are each controlled independently and directly by the action of the governor and the starting fuel is controlled indirectly by means of the inrushing air through the air-inlet passage, these modifications being fully within the scope and tenor of my said invention.

In the drawings annexed, Figure I shows an end view of the upper part of an engine with some parts in section in the plane $x\,y$ on Figs. II, III, IV, and V. Fig. II is a plan view of the lower part of Fig. I. Fig. III is a plan view showing the top of the engine. Fig. IV is an elevation side view of Fig. I. Fig. V is a plan view, principally in section, on an enlarged scale, in the plane $w\,z$ of Figs. I and IV. Fig. VI shows the bottom of the firing-plug and diagrammatically its electrical connections. Fig. VII is an elevation end view of an engine-cylinder and governor mechanism of a slightly-different type from that shown in Figs. I and IV. Fig. VIII is a plan view in the plane $p\,q$ on Fig. VII. Fig. IX is a sectional view, on an enlarged scale, in the plane $u\,t$ of Fig. I.

Figure 1:
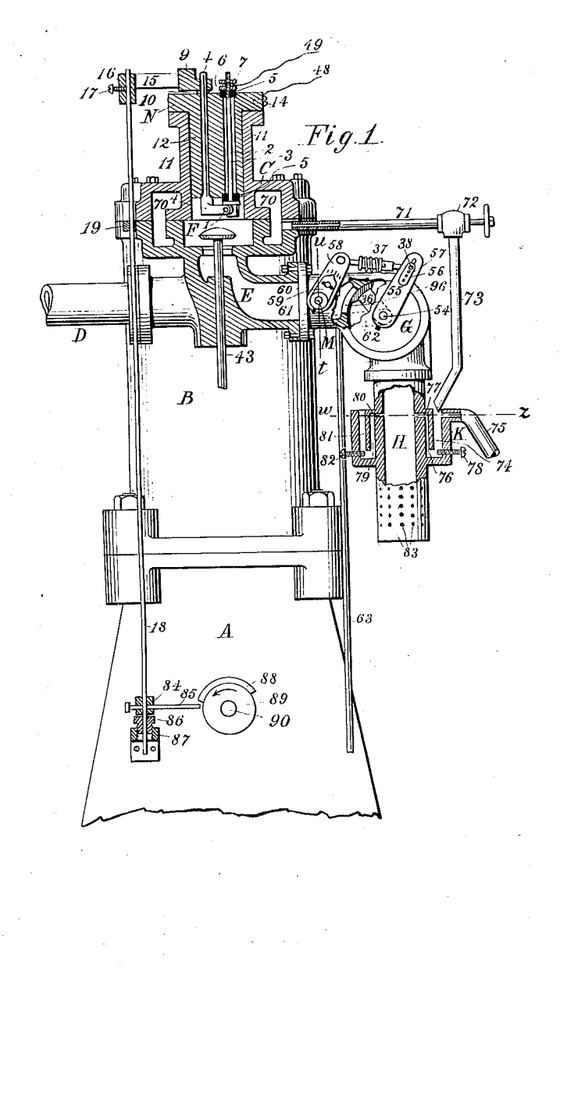
Figures 2, 3, 5, 9:
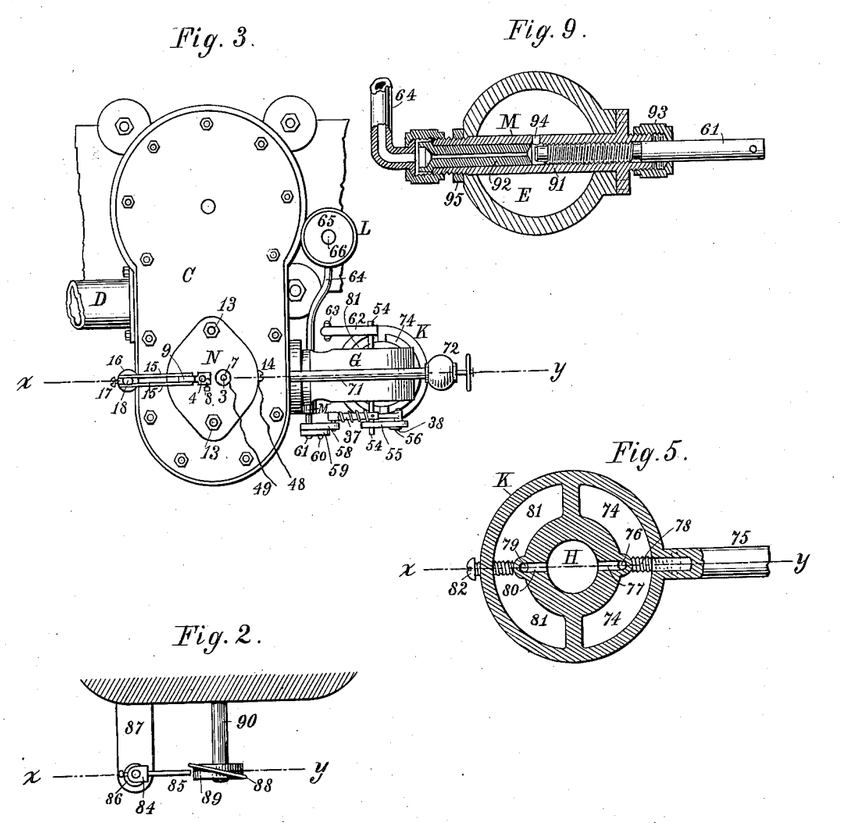
Figure 4:
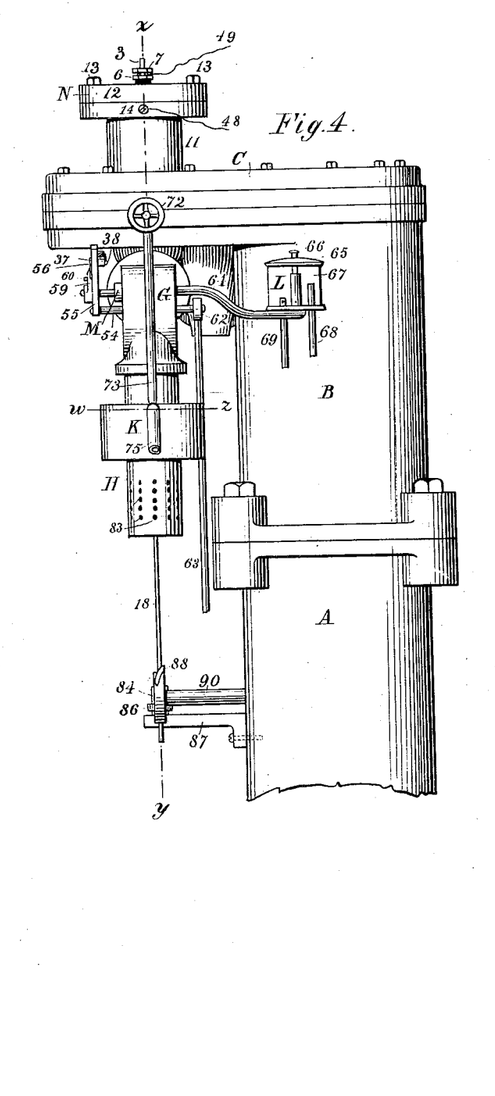
Figures 6, 7, 8:
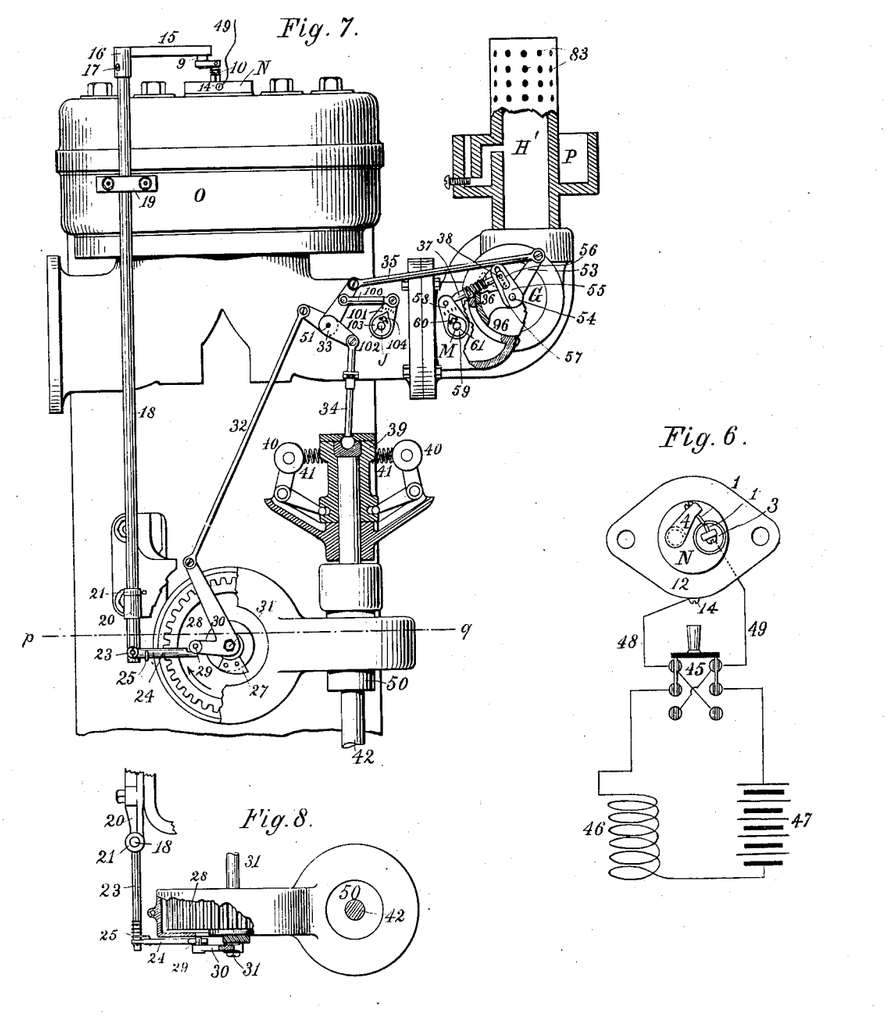

A represents the frame of the engine. (The shaft, wheels, gears, valve, cams, &c., are not shown.)

B is the cylinder.

C is the cylinder-cover, and D the exhaust-pipe.

E is the admission-passage, through which the fuel and air are supplied to the combustion-chamber F.

G is the air throttling-valve, and M the fuel throttling-valve.

H is the air-inlet passage.

K is the starting and water cup, and L the fuel-oil reservoir.

N is the firing-plug.

The cup K is an annular casting forming two similar separate chambers 74 and 81, both open at the top. From near the bottom of each chamber a vertical passage 79 and 76, respectively, leads nearly to the top and turns by the passages 80 and 77 toward and enters the air-inlet passage H at right angles thereto substantially in the form of a jet-nozzle. The size of the opening at the bottom of the passage 79 is controlled by the screw 82 and that of the passage 76 by the screw 78. The chamber 81 forms the starting-cup and the chamber 74 the water-cup.

The water-chamber 74 has an overflow-outlet 75, which drains it to or below the level of the bottom of the passage 77. Water is supplied to said chamber 74 in any convenient way, such as pipes 71 and 73, connected to the water-jacket chamber 70 and controlled by the valve 72.

The air throttling-valve G is supplied through the air-inlet passage H, which connects with the atmosphere by the perforations 83 in the sides of the inlet-pipe. Between the passages H and E is a restricted opening or port 96 in the air-valve chamber which is closed by the angular movement of the sector 36. The inlet from the passage E to the combustion-chamber F is controlled by the puppet-valve 43, (operated by any ordinary mechanism, not shown.)

Fuel-oil is pumped through the pipe 69 (by an ordinary pump operated by the engine, not shown) into the reservoir-chamber 67. The oil is maintained at or very near the level of the oil-throttling-valve outlet 94 by means of the overflow-pipe 68. The reservoir-outlet is through the pipe 64 and is controlled by the valve 66, held in place by the cover 65. The opening in the cover 65 for the stem of the valve 66 also affords a vent for the reservoir-chamber 67.

The oil throttling-valve M consists of a body 91, held in place in the passage E by the nut 95. A hollow removable seat 92 is engaged by a valve-stem 61. The outlet is at right angles to the passage E at 94 and operates substantially as a jet-nozzle. The stem 61 is made tight by the gland and packing-nut 93.

The governor (not shown) actuates vertically the rod 63, which by the lever 62 connects with the stem 54 of the air-valve G, on which is rigidly mounted the sector 36 and the lever 55. The lever-arm 55 is slotted toward the outer end, and a perforated disk 56, engaging a pin 57 and carrying the bolt 38 through the slot, determines the radius of the arc through which the said arm acts. The bolt 38 carries one end of a longitudinally-flexible connecting-rod 37, which in turn is attached to another arm 58, which moves loosely on the oil-valve stem 61. A third arm 59, made fast to said stem 61, is free to move through several degrees on the arm 58 and can be fastened rigidly thereto by the screw 60.

The firing-plug N consists of a body 12, which is held in the cylinder-head extension 11 by nuts 13 13. In this plug are two longitudinal bores, in one of which slides a movable bent terminal rod 4, while in the other is a relatively fixed terminal rod 3, surrounded by an air-space 2 and held in place by insulating-washers 5 5 and nut 6. A wire 49 is fastened to this terminal rod by nut 7. To the upper end of the terminal rod 4 by means of a lock-bolt 8 is attached an arm 9. Between the arm 9 and the top of the plug is a spring 10, which holds the terminal rod 4 in place. To the lower end portion of each terminal rod is provided a contact-point 1. The outer end of the arm 9 is made of uniform width, thin and high, as shown.

On the side of the cylinder-casting B is a bracket 19 and on the frame A another bracket 87, through which and a fitting 84 and knurled nut 86 is a rod 18, which has a head 16. This head is held in place by a set-screw 17 and carries two parallel flat springs 15 15. The normal distance between these two springs is equal to the width of the outer end of the above-mentioned arm 9. The nut 86 is threaded into the bracket 87. The fitting 84, made fast to the rod 18, carries the finger 85. The shaft 90 carries the wheel 89, on which is the cam 88, which imparts an angular motion to the finger 85 during a part of each revolution of the shaft 90. Turning the knurled nut 86 raises or lowers the fitting 84 and the finger 85, and its position determines the time when the cam 88 engages and releases the finger 85.

In the type of engine shown in Figs. VII and VIII the air-admission passage H' points upward and carries an annular volatile liquid combustible supply-cup P similar in function to side 81 of the cup K shown in Figs. I, III, IV, and V. In this type of engine the air-valve G and the fuel oil-valve M are as described above. The oil-valve M is supplied from a reservoir L. (Not shown in the drawings, but mounted on the cylinder-casting O, as shown on the cylinder-casting B in Figs. III and IV.) Mounted near the oil-reservoir L on the same side of the cylinder-casting O is a like reservoir supplied in a similar manner with water instead of oil and communicating with a water throttling-valve J similar in construction to the oil throttling-valve M. The water throttling-valve J occupies the same relative position in reference to the admission-passage E and its own water-reservoir that the oil-valve N occupies in reference to the same passage and to its reservoir L. In this engine the lay-shaft 42 is connected to the main shaft of the engine by helical gears (not shown) and made to revolve at the same speed as the engine. This shaft carries the governor-weights 40 and a loose sleeve 39. The governor-weights 40 are drawn together by the springs 41, and the rotative action of the engine causes them to fly outward and to lift the sleeve 39, which in turn imparts motion to the connecting-rod 34 and by means of a three-armed lever 33, pivoted at 51 to the three connecting-rods 32, 35, and 100. The connecting-rod 35 operates the arm 53, which is rigidly mounted on the stem 54, and its movement controls the air-valve G and the oil-valve M in the manner hereinbefore described in referring to the lever 62. (Shown in Figs. I, III, and IV. The connecting-rod 100, together with the arms 101 and 103 and the screw 104, controls the action of the water-valve stem, 102, in the manner hereinbefore described as to the control of the oil-valve stem 61 by the connecting-rod 37 and the arms 58 and 59 and the screw 60. The vertical lay-shaft 42 transmits motion to the horizontal cam-shaft 31 by means of spiral gears 50 and 28, having a ratio of one to two, so that the cam-shaft 31 makes one complete revolution for each four strokes of the piston. The vertical rod 18, carrying the spark-finger connection 15 16 17, as hereinbefore described, is supported by a collar 21 and a bracket 20. The rod 18 carries near to its lower end and at right angles to it an arm 23, having pivoted on its end a finger 24, the outer end of which is pressed upward by the spring 25. Pivoted on the shaft 31 is a forked lever 30, one arm of which engages the connecting-rod 32. The other arm of the lever 30 supports a pin 29, against which the finger 24 presses upward. The cam 27, rigidly connected to the shaft 31, revolves in the direction shown and during a portion of each revolution presses the finger 24 outward and then releases it, and thereby through the intervention of the arm 23 imparts the same motion to the rod 18 that the cam 88 imparts to a similar rod 18 through the finger 85 on the first type of engine hereinbefore described.

The action of the firing-plug is as follows: The wire 49, connected to the insulated terminal rod 3, as hereinbefore described, and the wire 48, which is connected by the screw 14 to the body 12, form in connection with the terminal rods 3 and 4 the contact-points 1 1, a switch 45, a source of electrical energy 47, and means for creating a spark, such as a coil 46, a complete electric circuit. The gearing or other mechanism (not shown) which rotates the shaft 90 one revolution for each four strokes of the piston is so adjusted that the cam 88 will engage the finger 85 at about the beginning of the compression-stroke and release it at or near the time when the piston starts on its downward travel following the completion of the compression-stroke. As the cam 88 imparts an angular motion to the finger 85 and a rotative motion to the rod 18 the free end of one of the springs 15 is pressed against the side near the middle of the arm 9, near the rod 4, and the said spring is thereby put under compression, while the end of the other spring is free to move outward to some distance from the arm 9. The arm 9 is so adjusted on the rod 4 that when its outer end is moved slightly out of the plane $x\ y$ the contact-points 1 1 are pressed firmly together and the electric circuit closed. When the cam 88 releases the finger 85, the spring 15, which has been pressing against the arm 9, instantly tends to straighten itself and turns the rod 18 and finger 85 back toward their normal position, thus bringing the free end of the other spring 15 against the outer end of the arm 9 with a sudden hammer-blow, which separates the points 1 1 very quickly and causes a good fat spark. As the position of the knurled nut 86 determines the time when the cam 88 releases the finger 85, it determines the exact time in reference to the motion of the piston when the contact-points 1 1 are separated and the electric spark made to occur to begin the firing of the compressed charge.

The action of the governor of the engine shown in Figs. I, II', III, and IV is as follows: The rod 63 is connected to a suitable governor, (not shown,) so that an increase in rotative speed causes the governor to lower the rod 63 and a decrease in rotative speed causes a raising of the same rod. When the engine is at rest or moving very slowly, this action of the governor by raising the rod 63 raises the lever 62, thereby turning the air-valve shaft 54 in a clockwise direction and moving the sector 36 until it exposes the opening 96, and thus opens the air-valve G. The same motion is transmitted by the connecting-rod 37 to the oil-valve M and by unscrewing its stem 61 opens the oil-passage. As the engine approaches its normal rotative speed the governor moves the rod 63 upward, and both the air and oil valves are closed until the requisite amount of each element is fed to the engine to maintain it at its normal rotative speed. By changing the position of the perforated disk 56 on the pin 57 it is obvious that the ratio of the radius of the arc through which the arm 55 acts to the radius of the arc through which the arm 58 acts may be varied, and consequently the angular motion imparted to the arm 58 by a given movement of the arm 55. This ratio can also be altered by changing the angle between the sector 36 and the arm 55. The freedom of movement of the arm 59 on the arm 58 permits fine adjustment of the stem 61 in reference to its seat 92. When each motor is being tested at the point of manufacture prior to shipment, the operator is enabled by these adjustments to provide for relatively stronger or weaker mixtures to suit the various chemical and thermodynamic conditions incident to varying load conditions, thereby securing for each degree of load the most efficient proportions between fuel and air in place of being forced to resort to a fixed proportion correct for only one degree of load, as has been heretofore necessary.

When liquid fuel is used, as is the case with the engines shown in the drawings, the fuel-valve should be very small as compared with the air-valve, and consequently much more sensitive to sudden or severe shocks. The connecting-rod 37 is therefore made longitudinally flexible for the purpose of relieving the fuel-valve of any sudden impulses transmitted by the governor mechanism and also for enabling the governor to close the fuel-valve slightly in advance of the air-valve without straining or injuring the former. This flexible connection is especially valuable when the engine is subjected to sudden or violent changes of load, as when all the load is thrown off at one time, thereby causing the governor to act with such suddenness and force as to jam the fuel-valve and injure it if not protected by this flexible connection.

The chamber 81 of the cup K is designed to hold sufficient volatile liquid combustible, such as alcohol, to furnish when properly commingled with air and exploded enough power to operate the engine for a short time until the combustion-chamber F and adjacent parts have reached a temperature approximating normal working conditions. When it is desired to start the motor into operation, the fuel oil-reservoir valve 66 is closed, thereby shutting off the normal supply of fuel. The chamber 81 is filled with volatile liquid combustible and the switch 45 closed. The engine is then rotated by a crank or other suitable means, and at the first suction-stroke the downward motion of the piston produces an inductive action, and the atmospheric air-pressure forces air through the perforations 83 into and through the air-passage H, the port 96, the air-passage E, and the valve 43 into the combustion-chamber F. As the air passes the nozzle 80 its mechanically-inductive and liquid-spraying action draws some of the volatile liquid combustible through the passage-way 79 and the nozzle 80 out of the chamber 81 and thoroughly atomizes and mixes it with the air charge. As the outlet 80 is slightly below the top of the annular casting K, the act of filling the chamber 81 full causes a slight overflow of the starting liquid into the passage-way H. As the result of this action the first charge drawn into the engine is sufficiently strong to be explosive, notwithstanding that when the starting operation begins the interior of the valve G and all of the passage-way E is filled with air not impregnated with the starting fluid. The first air charge as it moves through the passage H not only takes up and vaporizes the small quantity of starting fluid which has overflowed into the passage, but starts an inductive action through the nozzle 80. At the completion of this first suction-stroke the puppet-valve 43 closes in the usual manner and the compression-stroke follows, during which the cam 88 engages the finger 85.

Prior to applying the crank or other starting agent the nut 86 has been screwed downward, so that the cam 88 does not release the finger 85 until the piston has started on its downward travel after the completion of the compression-stroke. This being the case, the spark necessarily occurs when the crank has passed the center point, and the explosion of the initial charge forces the engine ahead and cannot in any case cause it to reverse its motion, this result, further, being accomplished irrespective of the speed at which the engine is started. With the second and each succeeding suction-stroke the inrushing air passes the jet-nozzle 80 and inhales and atomizes a fresh supply of the starting fluid. After one or two explosions the engine gains sufficient momentum to go through a complete cycle without external assistance, and after two or three more its speed is sufficiently accelerated to permit the governor to begin to act. In closing the air-valve G by restricting the valve-opening 96 the governor reduces the amount of air drawn into the engine at each suction-stroke, and consequently as a direct result reduces the quantity of starting fluid inhaled through the nozzle 80. At the same time that the governor is thus decreasing the air-supply as the result of the increased rotative speed of the engine the walls of the combustion-chamber F and of the cylinder absorb heat from the successive exploded charges and begin to approach normal working temperatures. As the temperatures of the combustion-chamber and the upper part of the cylinder increase the vaporization of the combustible during the compression-stroke is facilitated and the quantity of combustible required for the complete combustion of a unit mass of air is decreased. In order to decrease the amount of starting fuel supplied, both actually and in more rapidly-advancing ratio than the decrease in the quantity of air supplied to the successive explosive charges, the horizontal cross-section of the chamber 81 is so proportioned as to provide a constantly-lowering level following each inhalation of the starting fuel, such lowering level being in due proportion to the decreased demand for combustible in each explosive charge, which results from the increasing temperature of the combustion-chamber and cylinder. As the engine accelerates its speed the amount of fluid inhaled by the passage of a given unit of air across the nozzle 80 is relatively decreased on account of the level of the fuel in the chamber 81 being steadily lowered, thus increasing the burden of raising the liquid fuel through the passageway 79. This process of restricting the amount of air-supply by the action of the governor also decreases both the proportionate and actual amount of combustible supplied through the starting-cup. This diminution of the fuel-supply proceeds in a positive and entirely automatic manner until the available supply of liquid combustible contained in the starting-reservoir is exhausted. This available supply is the predetermined quantity of volatile liquid combustible sufficient for starting the engine into operation and maintaining it in operation until the rotative speed and the internal temperature of the combustion-chamber have reached a point so nearly approaching normal as to permit the employment of the fuel used for the regular operation of the engine, which when the engine is of the type shown in the drawings is a heavy oil—such, for example, as kerosene. The screw 82 affords the necessary means for manually adjusting the supply of starting fluid to suit varying conditions. By this arrangement of the reservoir 81, with its outlet-passage 79 connected to the jet-nozzle 80 and the passage-way H, which it enters at right angles thereto, means are provided for raising, atomizing, mixing with the air charge, and inhaling the volatile liquid combustible solely by governor-controlled atmospheric mechanical action and also for automatically controlling by the action of the governor itself in close coördination with the lowering level of the fuel in the reservoir 81 and also for automatically lessening both the relative and positive quantity of fuel inhaled, so that as the rotative speed of the engine accelerates and its internal temperature increases the mixture of each combustible charge is that required for complete combustion. The engine is thus started into operation without the commonly attendant troubles of an excessive supply of fuel, resulting, among other things, in fouling the engine or of an insufficient supply, which frequently causes the engine to stop during the starting process.

After the engine has acquired its normal rotative speed and when the supply of fuel in the starting-reservoir 81 is nearly exhausted the valve 66 is opened and the engine takes its regular supply of heavy oil in the following manner: The nut 86 is screwed upward until the cam 88 is made to release the finger 85 at such a time as to cause the separating of the points 1 1 just as the crank passes dead-center at the completion of the compression-stroke, thereby causing the burning of the charge at the most efficient stage. The nut 86 is afterward adjusted by the operator as required. As already stated, the outlet 94, which is virtually a jet-nozzle opening at right angles to the passage E, substantially as the nozzle 80 opens into the passage H, is connected with the reservoir L through the valve 66, pipe 64, and removable seat 92, and the supply is controlled by the valve-stem 61. As hereinbefore described, the connecting mechanism between the governor-controlled air-valve stem 54 and this oil-valve stem 61 has been adjusted so that the opening of the oil-valve M bears the most efficient relation to the opening of the air-valve G at all loads of the motor. Therefore when the valve 66 is opened the supply of heavy or non-volatile fuel-oil is furnished to the engine at the proper rate. The inrushing air passes the restricted opening 96 at a very high velocity, which at that point on account of the restriction of the said opening 96 greatly exceeds the velocity of the air traveling through the passage H or the body of the passage-way E. This accelerated blast of air rushes by the body of the oil-valve M and across the outlet-nozzle 94, thereby producing a very perfect inductive and atomizing effect, which not only sucks the oil through the connecting passage-ways from the reservoir L in a positive and reliable manner, but thoroughly atomizes and mixes it with the air charge. This operation is controlled by the governor, both by its action in restricting the size of the air-opening and the quantity of air admitted, and more directly by micrometrically throttling the oil-supply by the movement of the valve-stem 61. This inductive, atomizing, and mixing atmospheric mechanical action is entirely automatic, and as the fuel in the reservoir L is maintained at or very near the level of the outlet 94, so that the liquid fuel is supplied to the valve M only at atmospheric pressure, and as neither the reservoir L nor the connecting fittings are subjected to any heating effect from other parts of the engine at atmospheric temperature while the air supplied to the valve G through the passages 83 and H, also at atmospheric pressure and temperature in this system as in no other, both the fuel and air are supplied to the engine under identical physical conditions. This system, therefore, makes the operation of the engine entirely independent of changes in atmospheric temperature or barometric pressure, inasmuch as both the fuel and air are affected by each and all of such changes in the same manner.

Whenever the engine is stopped, the fact that the level of the oil in the reservoir L is at or below the level of the outlet 94 precludes any waste of oil, and automatically establishes safe and positive standby conditions. As the construction of the starting and water reservoirs K is similar, there can be no waste of either liquid in case the engine is stopped.

It is common knowledge among those familiar with the operation of internal-combustion engines that the high temperatures in combustion-chamber and cylinder resulting from high compression interpose a physical obstacle to the commercial employment of compression sufficient to produce the most efficient results both as to fuel consumption and as to power output for a given type of engine. This impediment has been especially characteristic of engines using heavy oils for fuel, and it has been necessary in that class of engines to employ lower compression and larger cylinders, thus making them unduly massive and placing them at a great disadvantage in respect of commercial competition with engines using other forms of fuel. As a part of my system I employ a water-reservoir 74, in which the water is maintained at a constant level very near the level of the jet-nozzle outlet 77, all as hereinbefore described. After the engine has been started into operation and its interior parts have reached normal working temperatures the valve 72 is opened and the reservoir 74 is filled. The valve 72 is opened sufficiently to insure a constant overflow of water through the overflow-pipe 75, thereby maintaining a constant level of water in the reservoir 74, even as a constant level of oil is maintained in the oil-reservoir L. As the nozzle 77, connecting-pipe 76, the reservoir 74, and the adjusting-screw 78 are alike, and bear the same relation to the passage-way H, as the nozzle 80, passage-way 79, reservoir 81, and adjusting-screw 82, the action of the inrushing air through the passage-way H inhales, atomizes, and mixes water with the air charge in the manner hereinbefore described in reference to the action of the starting liquid. The passage of each accurately-measured governor-controlled air charge past the nozzle 77 draws in a properly-proportioned and accurately-measured quantity of water sufficient for absorbing the amount of excessive heat produced by compression and the heat-radiating action of the walls of the combustion-chamber. Inasmuch as the water in the reservoir 74 is maintained at a constant level, the amount inhaled by each inrushing air charge depends wholly on the action of the said air charge, which is by the governor suitably proportioned to the engine-load. The presence of this proper amount of finely-atomized water-vapor distributed evenly throughout all of the explosive charge permits a much higher degree of compression, and therefore increases the efficiency without retarding or otherwise interfering with the combustion of the compressed charge. At the same time the presence of the water-vapor precludes premature combustion, which is characteristic of many types of heavy-oil engines when operating for several hours continuously at or near full load.

In the engine shown in Figs. VII and VIII, which is intended to illustrate the larger and more powerful types of heavy-oil engines, the starting-reservoir P may be an independent fitting on the air-admission pipe, its action being exactly as hereinbefore described in referring to the reservoir 81 of the cup K; but for the purpose of increasing its efficiency the water is supplied to a water-reservoir (not shown) exactly as the fuel-oil is supplied to the oil-reservoir L and is fed to the air charge through the water throttling-valve J, which is operated directly by the governor in the manner hereinbefore described. The action of the said governor-controlled water-valve J in coördination with the blast of the inrushing governor-controlled air charge across the outlet of the said valve J provides means for automatically supplying to each explosive charge the exact amount of water required for its most efficient performance. In this type of engine the forked arm 30, with the connecting-rod 32 and one arm of the three-armed lever 33, connecting it directly with the governor, replaces the nut 86, and by raising or lowering pin 29 the governor automatically changes the elevation of the end of the finger 24, and consequently the time at which it is engaged and released by the cam 27 in the same manner that the operator by the movement of the knurled nut 86 adjusts the action of the cam 88 and finger 85 in the manner hereinbefore described. When this engine is at rest or moving slowly, the pin 29 is at highest position and the cam, revolving in the direction shown by the arrow, releases the finger 24 when the piston has started on its downward travel, following the completion of the compression-stroke. As the engine accelerates in speed the pin 29 is depressed and the time of firing made earlier and earlier until at the maximum speed it occurs at the most efficient point about the time of the completion of the compression-stroke. As will be understood from this description, my invention comprises direct and positive control in due relation with each other of the air-supply by means of the valve G, of the fuel-supply by means of the valve M, of the water-supply by means of the valve J, and of the time of firing by means of the forked arm 30 and its connecting mechanism, all of the said mechanisms being actuated and controlled by the governor automatically—that is to say, without the intervention of any external or independent agency applied from the moment the engine is initially started.

What I claim as my invention, and desire to secure by Letters Patent, is—

1. In an internal-combustion engine the combination of an air throttling-valve, a fuel throttling-valve, and a water throttling-valve, with a governor adapted to vary the quantity of the combustible charge, and the relative proportions of air, fuel and water, in coördination with the variations in quantity of said charge.

2. In an internal-combustion engine the combination of a governor-controlled air-valve; a governor-controlled liquid-fuel valve; a governor-controlled water-valve; two reservoirs for containing liquid, each provided with means for maintaining the surface of the liquid contained therein at a constant height; a connecting-passage, or pipe from one of said reservoirs to said liquid-fuel valve; and a connecting-passage, or pipe from the other of said reservoirs to said water-valve.

3. In an internal-combustion engine the combination of an air throttling-valve, a fuel throttling-valve, a water throttling-valve, a liquid-fuel receptacle, and a water-receptacle, each of said receptacles having a discharge passage-way opening into the air-inlet passage at a level above the surface of the liquids contained in said receptacles, with a governor adapted to vary the quantity of the combustible charge, and the relative proportions of air, fuel and water, in coördination with the variations in quantity of said charge.

4. In an internal-combustion engine adapted to inhale water, the combination of a common admission-passage and valve for admitting a mixed charge of air, fuel and water, a governor adapted to control simultaneously and independently, the supply of air and fuel contained in each charge; a reservoir for holding water; a pipe, or vertical passageway connecting with said reservoir having an inlet near the bottom of the reservoir, and an outlet in said admission-passage, with means for maintaining a constant level in said water-reservoir, said level being below the level of said outlet in said admission-passage.

5. In an internal-combustion engine having a cylinder and piston therein adapted to employ the reduced internal pressure, occurring during each suction-stroke in order to inhale water as a constituent ingredient of the fuel charge, the combination of a common admission passage and valve for admitting air, fuel and water, means for enabling said piston during said suction-stroke to inhale the air, fuel and water, with means for automatically varying in coördination the proportions of said air, fuel and water, and the volume of mixture, so as to provide relatively weaker mixtures for higher compressions and increasingly stronger mixtures for the lower compressions.

6. In an internal-combustion engine having independent air, fuel and water valves, the combination with a governor of means for enabling said governor to vary the relative proportions of air, fuel and water contained in the combustible mixture, and an ignition mechanism operatively connected with said governor for varying the time of ignition in coördination with said variation in relative proportions, substantially as, and for the purpose specified.

7. In an internal-combustion engine in which the governor controls simultaneously and independently the supply of air, fuel and water, composing the successive charges admitted to the engine, and the time of firing each charge, the combination of an air throttling-valve, a fuel throttling-valve, and a water throttling-valve, with a governor adapted to vary the quantity of the combustible charge, and the relative proportions of air, fuel and water, in coördination with the variation in quantity of said charge.

8. In an internal-combustion engine in which the governor controls simultaneously and independently, the supply of air, fuel and water composing the successive charges admitted to the engine, and the time of firing each charge, the combination of an air throttling-valve, a fuel throttling-valve and a water throttling-valve, all opening into a common admission-passage, or valve-chamber, and an electrical ignition-timing mechanism, with a governor, adapted to control in unison, the proportions and quantity of air, fuel and water, and the time of ignition.

9. The combination with an internal-combustion engine of a governor adapted to control in unison the relative movements of an air-valve, a fuel-valve, a water-supply device, and an electric ignition-timing device; said governor operatively controlling in common the movements of said mechanisms so as to determine (1) the relative proportions of air, fuel and water contained in each combustible charge; (2) the volume of each charge; and thereby the degree of compression of each charge; (3) the internal temperature of the combustion-chamber; (4) and the time of ignition of said combustible charge.

10. In an internal-combustion engine, the combination of a governor adapted to control an air-valve, a fuel-valve, a water-supply mechanism, and an ignition-timing mechanism, so as to alter the time of firing, and the relative proportions between the air, fuel and water, and the total quantity of said air, fuel and water entering the combustion-chamber of the engine, and thereby the compression, and temperature of each successive combustible charge in said combustion-chamber, in response to the variations in speed, or power, with means for changing the limits of rotative speed within which said governor performs said common control.

11. In an internal-combustion engine in which the governor controls simultaneously and independently, the supply of air, fuel and water composing the successive charges admitted to the engine, the combination of a liquid-fuel reservoir and a water-reservoir, each of said reservoirs connecting with a throttling-valve which has an outlet located within the air-inlet passage, and in the path of the inward air-current, an air throttling-valve, opening into said air-inlet passage, with a governor for controlling all of said valves, and a working piston adapted by its movement during the suction-stroke to inhale the air, fuel and water forming the combustible mixture simultaneously.

12. In an internal-combustion engine having a cylinder and piston therein, the combination of a liquid-fuel reservoir, a liquid-fuel throttling-valve, an air throttling-valve, a governor, and valve-operating devices connected with said governor for imparting movements to each of said throttling-valves whereby said governor varies the volume of mixture and also increases the proportion of fuel as the volume of mixture is decreased; with means for enabling said piston to inhale liquid fuel from said reservoir during the suction-stroke, the air and fuel being inhaled at the same time, temperature and pressure, and at a common place of admission, substantially as described.

13. In an internal-combustion engine adapted to inhale water for internal cooling, the combination of a piston adapted by its suction movement to inhale each ingredient of a combustible mixture at the same time, the same temperature, under the same pressure, and through the same admission-valve and also to atomize and commingle the liquid ingredients with the air-supply; a governor adapted to vary the volume of the fuel mixtures, as well as the relative proportions of the constituent ingredients in said mixtures; a combustion-chamber in which the air charge absorbs and incorporates the vapors evolved from the atomized liquids commingled with, and held in suspension by said air charge; substantially as, and for the purpose specified.

14. The combination with the admission-passage of an internal-combustion engine, of a combustion-chamber in which the vapors of the liquid ingredients of the fuel charge are evolved by heat while intermingled with the air charge, and of air, fuel and water are evolved by heat while intermingled with throttling-valves communicating with said admission-passage; and a governor having a yielding connection with two of said throttling-valves and a rigid connection with the third.

15. In an internal-combustion engine the combination, with an air-admission passage of a liquid throttling-valve consisting of a tubular body supported by, and passing across said air-admission passage and held therein by a nut or screws, having a centrally-located outlet-opening in the form of a nozzle in the path of the air through said air-admission passage; a screwed valve-stem within said body, a hollow removable seat within said body, meeting said stem at or near said outlet, and a gland or packing nut for preventing leakage about said stem.

16. In an internal-combustion engine, the combination of an admission-passage; a perforated pipe connecting said passage with the atmosphere; an admission-valve, connecting said passage with the combustion-chamber; an air throttling-valve restricting said passage; a fuel throttling-valve supported by, and opening into said passage; between said air throttling-valve and said admission-valve, having an outlet at substantially right angles to said passage, in close proximity to the restricted opening of said air throttling-valve; an inertia-governor; a yielding connection with said fuel throttling-valve; and mechanism for actuating said fuel throttling-valve by said governor through said yielding connection, so as to vary both the actual and the relative openings of said throttling-valve.

17. In an internal-combustion engine adapted to have its operation started by means of a limited, or predetermined supply of volatile liquid fuel, the surface level of which is steadily lowered, and the quantity contained in each successive charge continuously lessened, the combination of a governor-actuated air throttling-valve, a reservoir for holding the predetermined supply of volatile liquid fuel, an opening in said reservoir for filling the same, a pipe or passage-way connecting the lower part of said reservoir with the inlet-passage of said air throttling-valve, having an outlet lower than said opening for filling, but arranged so that said reservoir cannot be emptied by gravity; said outlet discharging substantially at a right angle to the path, or direction of the air-current, entering said air throttling-valve.

JOHN ALSTYNE SECOR.

Witnesses:
JAMES A. WHITNEY,
GEO. R. HALL.